Feb. 5, 1952 D. W. TIFFANY 2,584,242
REFRIGERATING SYSTEM FOR TRAILERS
Filed Jan. 7, 1948 2 SHEETS—SHEET 1

D. W. Tiffany
INVENTOR
BY *Ch Knowles*
ATTORNEYS.

Feb. 5, 1952 D. W. TIFFANY 2,584,242
REFRIGERATING SYSTEM FOR TRAILERS
Filed Jan. 7, 1948 2 SHEETS—SHEET 2
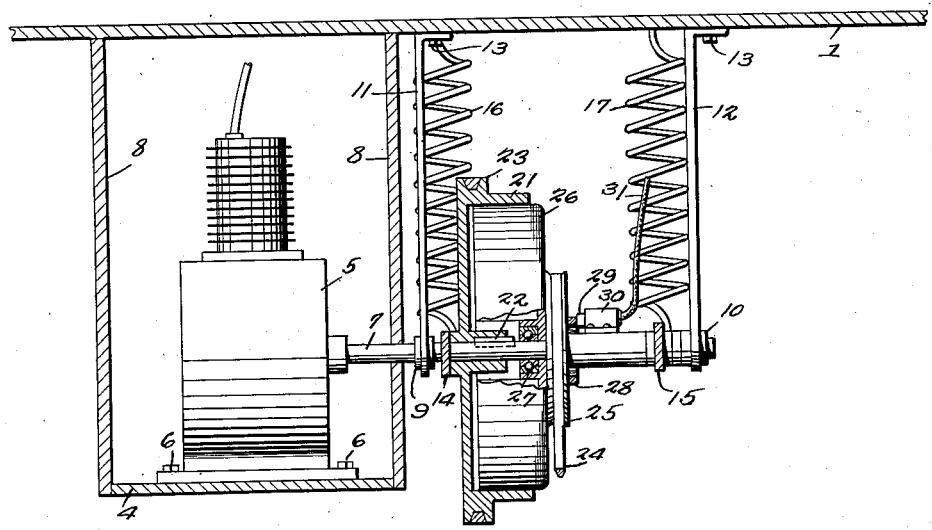
D. W. Tiffany
INVENTOR
BY C. A. Snowles
ATTORNEYS.

Patented Feb. 5, 1952

2,584,242

UNITED STATES PATENT OFFICE 2,584,242

REFRIGERATING SYSTEM FOR TRAILERS

Daniel Warren Tiffany, Great Falls, Mont.

Application January 7, 1948, Serial No. 921

1 Claim. (Cl. 230—33)

This invention relates to improvements in refrigerating systems for trailers.

An object of the invention is to provide an improved refrigerating system for trailers including a compressor, a road-engaging wheel for driving the same, and an electrically operated and controlled clutch interposed between said compressor and road-engaging wheel.

Another object of the invention is to provide an improved refrigerating system for trailers including a compressor unit and means for relatively driving the same including a road-engaging wheel and an electric motor which are used respectively for driving the compressor unit when the trailer is in motion or when it is not in motion.

A further object of the invention is to provide an improved refrigerating system for trailers which may be driven either by a road-engaging wheel or by an electric motor operated from a suitable source of electric current supply (not shown), together with an electric clutch mechanism and a cold control for controlling the operation of the same.

A still further object of the invention is to provide an improved refrigerating system for trailers which will be highly efficient in operation, and relatively inexpensive to manufacture and produce.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 3 is a sectional view taken on the line 3—3 of Figure 2.

Figure 4 is a diagrammatic view of the electrically operated clutch, electric driving motor and the cold control for controlling the operation of the clutch.

Like characters of reference are used throughout the following specification and the accompanying drawing to designate corresponding parts.

Figure 1:
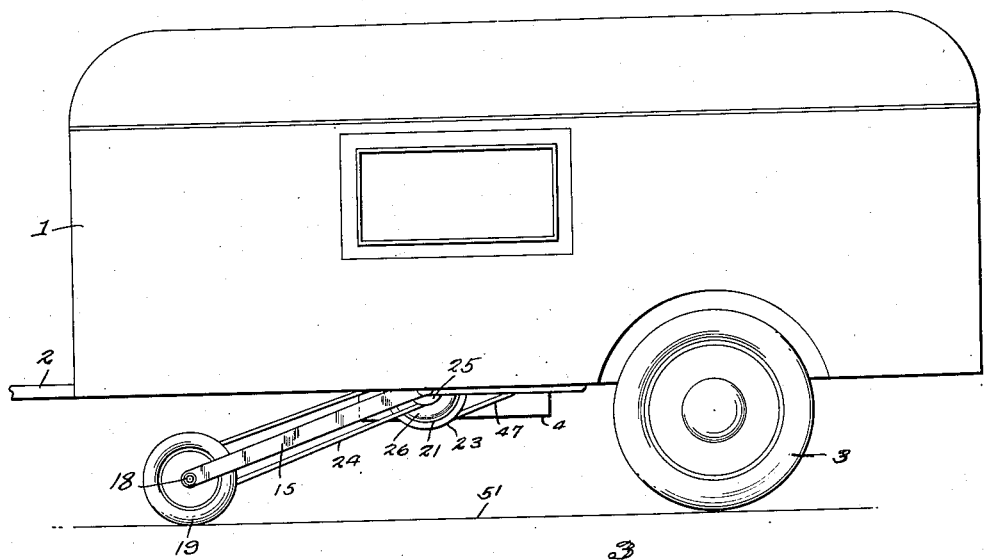
Figure 1 is a side elevation of a trailer showing the compressor operating road-engaging wheel and electrically operated clutch.
Figure 2:
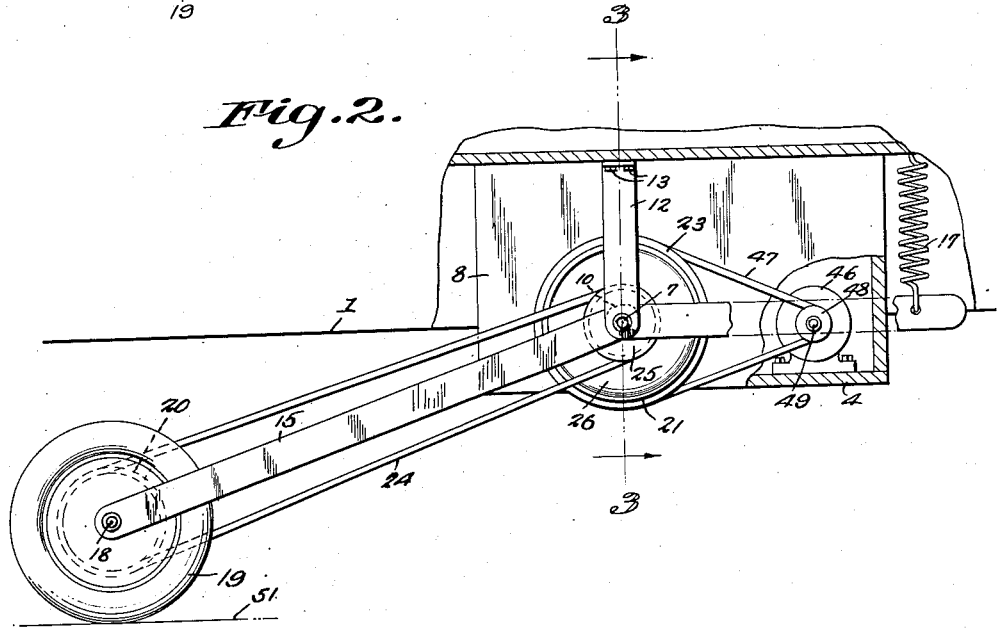
Figure 2 is an enlarged detail view, being partly broken away and in section, showing the electrically operated clutch and road-engaging drive wheel and electric motor used for operating a compressor unit when the trailer is in motion, or is not in motion.

In carrying out the invention, there is provided a trailer having a body 1, a draw bar 2, wheels 3, and a platform 4 supported beneath the body of the trailer, said trailer being of the refrigerator type generally used for transporting various foods and other articles which have to be kept at a suitable refrigerated temperature while being shipped.

A compressor unit 5 is secured by the bolts 6 to the platform 4, and will be connected in the usual manner to a refrigerating unit (not shown) positioned within the trailer body 1. The shaft 7 of the compressor unit 5 extends through a side wall 8 which supports the platform 4, and is rotatably mounted in the aligned bearings 9 and 10 disposed in the lower ends of the transversely spaced depending steel hangers 11 and 12 secured to the bottom of the trailer body 1 by means of the bolts 13.

A pair of forwardly and downwardly extending parallel side arms 14 and 15 are rockably supported upon the compressor unit shaft 7, and have their rear ends extending rearwardly of the shaft 7. Coil springs 16 and 17 will be secured at their upper ends to the floor of the trailer body 1, while their lower ends will be connected with the rear extremities of the arms 14 and 15, to exert a resilient tension on the same for forcing the forward ends of the arms 14 and 15 downwardly.

An axle 18 will be connected between the forward ends of the arms 14 and 15, and will support a rubber tired ground-engaging wheel 19 and a pulley 20 rotatable therewith.

An improved electro-magnetic clutch such as shown in Patent No. 2,305,788, granted December 22, 1942, is provided and comprises an outer drum 21 secured to the compressor unit shaft 7 by means of the key 22, and formed with a large integral pulley 23 about its periphery. A belt 24 will be disposed about and between the pulley 20 and a small pulley 25 fixed to the inner drum 26 of the clutch for driving said inner drum which is disposed concentrically within the outer drum 21, and is loosely mounted upon the ball bearing roll 27 upon the shaft 7.

A collector ring 28 will be secured to the side of the pulley 25 and a brush 29 housed in the casing 30 will make electrical contact therewith. An electric conductor 31 will lead from the brush 29 to the switch contact 32 on the double pole-double throw switch 33. The switch contact 34 will be connected by conductor 35 to a 6-volt battery 50, and the opposite side of the battery grounded as at 36.

The blades 37 and 38 of the switch 33 will be connected in parallel with a suitable thermostatically operated cold control device 39 by means of the conductors 40 and 41.

The opposite switch contacts 42 and 43 will be connected by means of the conductors 44 and 45 in series with an A. C. motor 46 and connected to a suitable source of electric current supply (not shown).

A belt 47 will be disposed about and between the large pulley 23 on the outer clutch drum 21 and the drive pulley 48 on the shaft 49 of the electric motor 46.

In operation, the road-engaging wheel 19 will be resiliently urged into contact with the ground 51 by means of the coil springs 16 and 17, and as long as the cold control is set for the operation of the compressor unit 5, the electrically operated clutch will be energized to permit the outer and inner drums 21 and 26 to be coupled together to drive the compressor unit. If the temperature in the trailer body 1 gets below the temperature for which the control is set, the electromagnetic clutch will be deenergized and the road-engaging wheel 19 will drive only the inner drum 26 without driving the compressor unit 5. When the trailer is not being drawn over the road or ground 51, the motor 46 will be utilized for operating and driving the compressor unit 5.

While the preferred embodiment of the instant invention has been illustrated and described, it will be understood that it is not intended to limit the scope of the invention thereto, as many minor changes in detail of construction may be resorted to without departure from the spirit of the invention.

What is claimed is:

An operating unit for the compressor of a refrigerating system for trailers, comprising hangers mounted under the trailer, a shaft supported in the hangers, a compressor operated by the shaft, spaced arms of bell-crank formation mounted on said shaft at points intermediate the ends of said arms providing long arm sections and short arm sections, a ground engaging wheel mounted on the forward ends of said long arm sections, a platform suspended under the body of the trailer, a motor mounted on the platform, means including a clutch adapted to transmit motion from said ground engaging wheel to said shaft and motor, and coiled springs connected between the trailer and short arm sections, normally urging the ground engaging wheel into contact with the ground surface.

DANIEL W. TIFFANY.

REFERENCES CITED

The following references are of record in the file of this patent:

UNITED STATES PATENTS

| Number | Name | Date |
|---|---|---|
| 2,096,910 | McIntosh | Oct. 26, 1937 |
| 2,214,055 | Henney | Sept. 10, 1940 |
| 2,305,788 | Kemmler et al. | Dec. 22, 1942 |
| 2,308,079 | Henney | Jan. 12, 1943 |
| 2,317,135 | Crittenden | Apr. 20, 1943 |
| 2,439,686 | Findley | Apr. 13, 1948 |